W. A. AUSTIN.
FISHING ROD.
APPLICATION FILED JAN. 27, 1909. RENEWED OCT. 1, 1909.
942,030.
Patented Nov. 30, 1909.
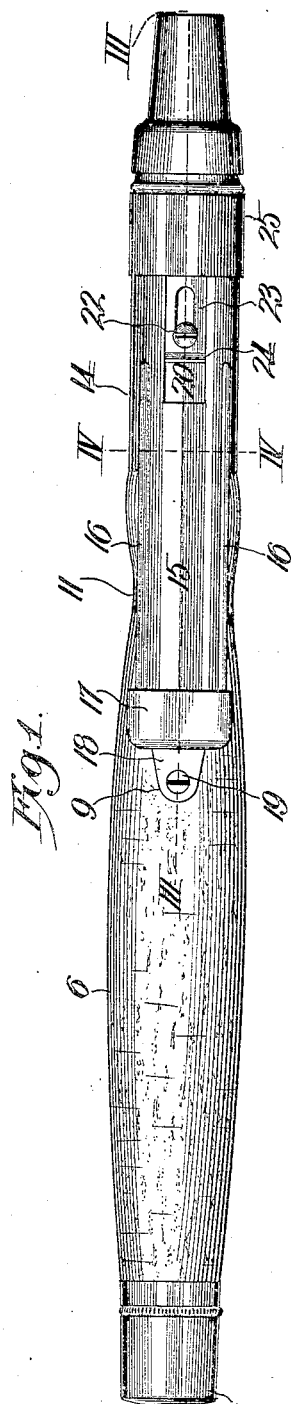
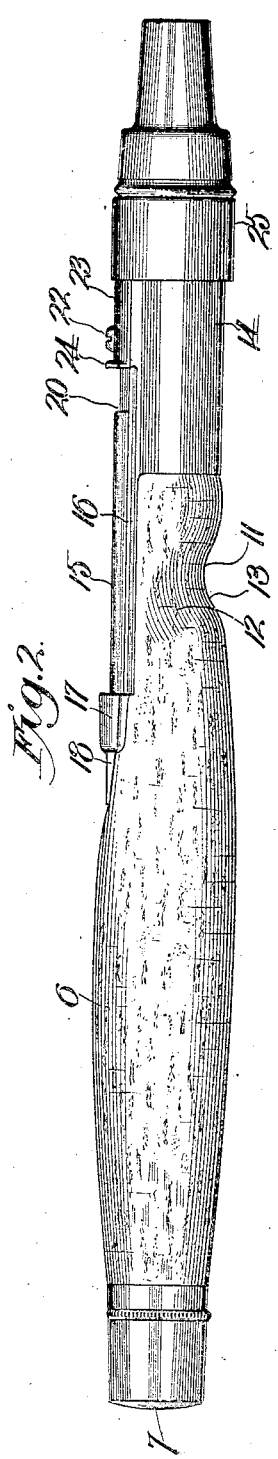
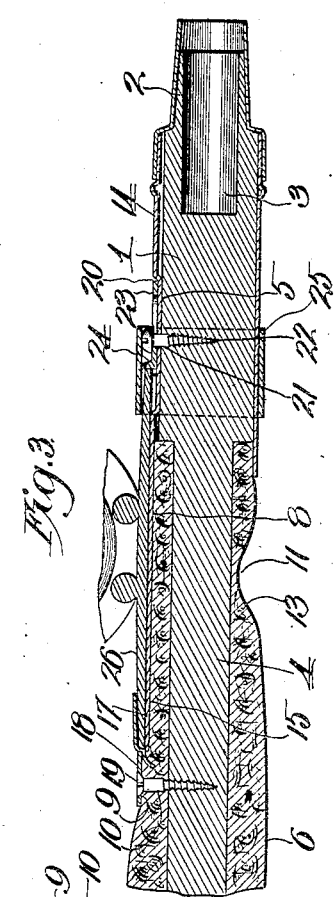
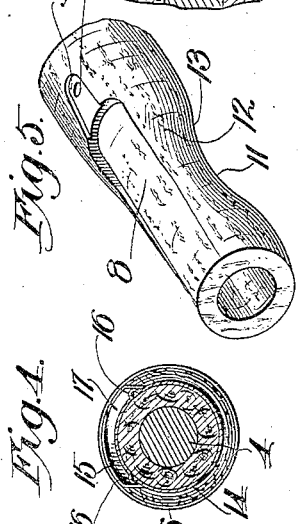
Witnesses
Frank R. Glore
H. C. Rodger
Inventor
W. A. Austin
By George F. Thropp Atty

UNITED STATES PATENT OFFICE.

WILL A. AUSTIN, OF KANSAS CITY, MISSOURI.

FISHING-ROD.

942,030.  Specification of Letters Patent.  Patented Nov. 30, 1909.

Application filed January 27, 1909, Serial No. 474,397. Renewed October 1, 1909. Serial No. 520,596.

*To all whom it may concern:*

Be it known that I, WILL A. AUSTIN, a citizen of the United States, residing at Kansas City, in the county of Jackson and State of Missouri, have invented certain new and useful Improvements in Fishing-Rods, of which the following is a specification.

This invention relates to fishing rods and more especially to handles and reel-seats therefor, and has for its object to produce a handle equipped with a grip which projects forward under the reel seat in order that the fisherman's index finger of one hand may conveniently remain in contact with the grip in casting, and the second finger of his other hand remain in contact with the grip in reeling in the line.

A further object is to produce a fishing rod equipped with adjustable means for clamping a reel-base of any length upon the seat for coöperation with the usual clamping collar in guarding against accidental slippage of the reel in the operation of the latter or the manipulation of the rod.

With these general objects in view the invention consists in certain novel and peculiar features of construction and organization as hereinafter described and claimed; and in order that it may be fully understood reference is to be had to the accompanying drawing, in which;

Figure 1, is a top plan view of a fishing rod handle embodying my invention. Fig. 2, is a side elevation of the same. Fig. 3, is a section on the line III—III of Fig. 1. Fig. 4, is a section on the line IV—IV of Fig. 1. Fig. 5, is a perspective view of a part of the grip.

In the said drawing, 1 indicates a cylindrical core of hard wood or equivalent material having its front end diametrically reduced as at 2 and provided with a longitudinal socket 3. A suitable distance rearward of the socket the core is diametrically reduced as at 4 and between said reduced portion 4 and the socket, its non-reduced portion is provided with a shallow longitudinal groove 5.

6 indicates a tubular grip preferably of cork, fitting snugly on the reduced portion 4 of the core and bearing at its front end against the non-reduced portion of the latter, the rear end of the grip being overlapped by the customary ferrule 7 fitting on the rear end of the core.

The grip is provided in its upper side with a longitudinal groove 8 extending from its front end a suitable distance rearward and by preference is also provided with a shallow recess 9 at the rear end of the groove 8, and with a radial hole 10 coincidental with recess 9. The extension-portion of the grip viz., that portion formed with the groove 8 is also formed with an exterior groove 11 extending transversely and of greatest depth vertically below groove 8, the side portions of groove 11 preferably sloping upward and rearward as shown most clearly in Fig. 1 and by the shading 12 in Figs. 2 and 5, the provision of such groove resulting in the production of a shoulder 13 against which the index finger of the operator may effectively bear.

14 indicates a metallic sleeve fitting snugly on the non-reduced portion of the core and provided with an extension 15 fitting snugly in groove 8, and provided at its side margins with outwardly-projecting parallel stiffening and reel-retaining ribs 16, the underlying portion of the cork grip providing a slightly resilient bed or rest for such extension. At its rear end the extension is equipped with a rigid and forwardly opening pocket 17 having a rearwardly-projecting lug 18 occupying the recess 9 and secured rigidly to the grip and to the core by a screw 19. Forward of the grip the sleeve 14 is stamped downward to produce an external longitudinal groove 20 provided with a hole 21 through which a screw 22 extends to coöperate with screw 19 in holding the sleeve in place, said screw 22 also extending through a longitudinally slotted slide-clamp 23 of such proportion that its outer surface forms a continuation of the exterior side of the sleeve, the rear end of the slide-clamp terminating in a flange 24 which projects outwardly beyond the circumferential plane of the sleeve for a purpose which hereinafter appears, and slidably mounted on the sleeve and of sufficient diameter to slip over the flange 24 and head of the screw 22, is a clamping collar 25.

To illustrate clearly how a reel is secured in position Fig. 3 is shown as equipped with a reel base 26, the same fitting between the guide ribs 16, with its rear end in pocket 17 and its front end engaged by the flange of the slide-clamp 23, said clamp being fitted against the reel seat and then secured in such position by the clamping screw 22. By this means the reel seat is prevented from moving endwise, and in order to hold it from dislocation otherwise, the collar 25 is forced rearwardly to substantially the position shown in Fig. 3, where, it will be noticed, it overlaps the front end of the reel seat, which by preference tapers slightly toward each end in the usual manner.

With the ordinary fishing rod in which the front end of the grip meets the rear end of the sleeve in substantially the vertical plane of the rear end of the reel-base, or where the metallic sleeve, projects materially rearward of the reel-base, it is necessary in casting, for the index and middle finger of the casting hand to grip the metallic sleeve, and it is also necessary for the middle and last two fingers of the other hand to grip said sleeve when the line is being reeled in.

In cold weather the contact of the fingers with the metallic sleeve chills the hand and this is particularly true when the sleeve has become wet from any cause. Under such conditions it is difficult to handle the rod skilfully and reliably.

With a rod in which the cork or equivalent grip extends forward to a plane approximately the same as that of the front side of the reel, the operator can conveniently, reliably and comfortably maintain the grasp of his fingers on the grip extension, such grasp being made more reliable because the extension is reduced diametrically by the groove 11 and affords a fairly abrupt shoulder 13 to receive the backward pressure or pull of his index or second finger.

In reeling in the line the rod is held usually in his other hand and in such event the thumb is overlying the reel to control its rotation and coöperate with the index finger of such hand in guiding the line in its rewinding action, the remaining fingers of the hand underlying the reel in contact with the grip extension instead of with the cold metallic sleeve.

From the above description it will be apparent that I have produced a fishing rod embodying the desirable features enumerated and which is susceptible of modification in minor particulars without departing from the spirit and scope of the appended claims.

Having thus described the invention what I claim as new and desire to secure by Letters-Patent, is:

1. A fishing rod handle provided with a sleeve having a rearwardly-projecting extension, and a grip provided with an extension projecting forwardly to the rear end of the sleeve and underlying the extension thereof.

2. A fishing rod handle provided with a sleeve having a rearwardly-projecting extension, and a grip provided with an extension projecting forwardly to the rear end of the sleeve and underlying the extension thereof; said grip extension having an external transversely-extending groove.

3. A fishing rod handle, comprising a core, provided with a diametrically-reduced portion, a sleeve fitting on said core and provided with an extension overlying and spaced from the reduced portion of the core, a tubular grip fitting on the reduced portion of the core and bearing at its front end against the non-reduced portion thereof, and forming a seat for the extension of the sleeve, and means for fastening the sleeve and grip to the core.

4. A fishing rod handle, comprising a core, provided with a diametrically-reduced portion, a sleeve fitting on said core and provided with an extension overlying and spaced from the reduced portion of the core, a tubular grip fitting on the reduced portion of the core and bearing at its front end against the non-reduced portion thereof, and forming a seat for the extension of the sleeve, means for fastening the sleeve and grip to the core, a forwardly opening pocket at the rear end of the extension of the sleeve, and a slidable collar upon the sleeve and adjustable toward and from said pocket.

5. A fishing rod handle, comprising a core provided with a diametrically-reduced portion a sleeve fitting on said core and provided with an extension overlying and spaced from the reduced portion of the core, a tubular grip fitting on the reduced portion of the core and bearing at its front end against the non-reduced portion thereof, and forming a seat for the extension of the sleeve, means for fastening the sleeve and grip to the core, a forwardly opening pocket at the rear end of the extension of the sleeve, a longitudinally adjustable clamp-plate carried by the sleeve, and a collar adjustable upon the sleeve and over the clamp-plate toward and from the said pocket.

6. A fishing rod handle, comprising a core having a reduced extension, a tubular grip fitting on the reduced portion of the core and bearing at its front end against the non-reduced portion thereof and provided in its upper side and front end with a groove, a sleeve fitting on the non-reduced portion of the core and provided at its rear end with a rearwardly-projecting extension fitting in the groove of the grip, and provided at its rear end with a forwardly-opening pocket; said sleeve also having a longitudinal groove in its upper side forward of said extension, a screw extending through the grip and into the core and holding the sleeve-extension rigid, a screw extending through the grooved portion of the sleeve and into the core, a longitudinally-adjustable clamp-plate engaging the groove of the sleeve and provided with a longitudinal slot through which the last-named screw extends, and provided also with an upwardly-projecting flange at its rear end, and a longitudinally-adjustable collar mounted on the sleeve and adapted for movement over said flange.

In testimony whereof I affix my signature in the presence of two witnesses.

WILL A. AUSTIN.

Witnesses:
    HELEN C. RODGERS,
    G. Y. THORPE.